United States Patent [19]

Leonard

[11] Patent Number: 4,738,441
[45] Date of Patent: Apr. 19, 1988

[54] DATA SCANNING APPARATUS

[75] Inventor: George H. Leonard, Darien, Conn.

[73] Assignee: GTECH Corporation, Providence, R.I.

[21] Appl. No.: 770,793

[22] Filed: Aug. 29, 1985

Related U.S. Application Data

[63] Continuation-in-part of Ser. No. 553,846, Nov. 11, 1983, Pat. No. 4,659,073.

[51] Int. Cl.$^4$ .............................................. B65H 5/00
[52] U.S. Cl. ...................................... 271/3; 271/250; 271/268; 271/275; 271/277
[58] Field of Search .................. 271/3, 9, 226, 234, 271/239, 248, 253, 254, 255, 268, 272, 275, 277, 900, 250, 252, 314, 273, 274; 346/134, 138, 132, 125; 360/87; 235/483, 485; 198/788; 221/259, 260

[56] References Cited

U.S. PATENT DOCUMENTS

| | | | |
|---|---|---|---|
| 2,695,785 | 11/1954 | Dashiell et al. | 346/138 |
| 3,089,746 | 5/1963 | Beyer | 271/3 X |
| 3,108,799 | 10/1963 | Clemens et al. | 235/475 X |
| 3,415,509 | 12/1968 | Tyburski et al. | 271/248 |
| 3,635,466 | 1/1972 | Townsend | 271/272 X |
| 3,671,719 | 6/1972 | May | 271/902 X |
| 3,929,327 | 12/1975 | Olson | 271/250 |
| 3,941,375 | 3/1976 | LaWhite et al. | 271/272 X |
| 4,015,839 | 4/1977 | McKee | 271/275 X |
| 4,056,263 | 11/1977 | LaWhite et al. | 271/3 |

OTHER PUBLICATIONS

IBM Technical Disclosure Bulletin, "Paper Entry-Exit Mechanism", by R. A. Bielling et al., vol. 22, No. 8B, Jan. 1980, pp. 3488 and 3489.
IBM Technical Disclosure Bulletin, "Paper Feed", by S. P. Garrison et al., vol. 22, No. 5, Oct. 1979, pp. 1746-1748.

Primary Examiner—Joseph J. Rolla
Assistant Examiner—David H. Bollinger

[57] ABSTRACT

The disclosed apparatus has a data reading head and an elastomer ring on a driven rotor within stationary arcuate outer guide means for driving a sheet along a path starting and ending at a common location and passing the reading head. The elastomer ring and the outer guide are shaped so that their cooperation biases sheets against and into edgewise alignment with side guide means along portions of the path approaching the reading head and departing from the reading head. The sheet feeding path is arched away from the elastomer ring in the region of the elastomer ring, and the guide means has a light-absorbing channel that is uninterrupted by the elastomer ring disposed opposite the data reading head. The entire apparatus is readily opened up for service virtually without resort to tools and restored to operative condition without need for adjustments.

32 Claims, 6 Drawing Sheets

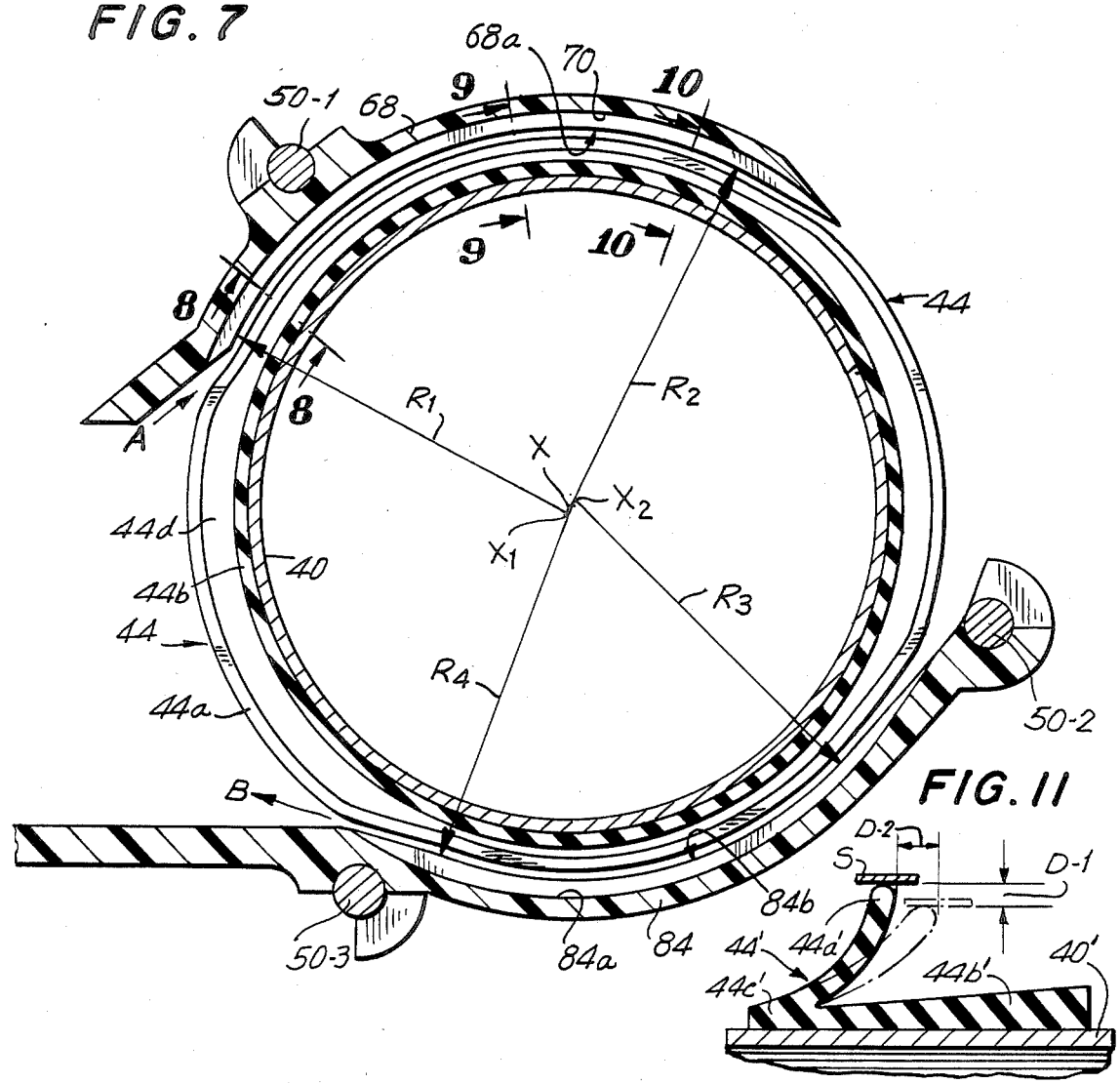

DATA SCANNING APPARATUS

This application is a continuation-in-part of application Ser. No. 553,846, filed Nov. 11, 1983, now U.S. Pat. No. 4,659,073, incorporated here by reference.

This invention relates to apparatus for scanning or reading data on cards or sheets.

The previous application shows and describes apparatus for accepting a manually inserted data-bearing card or sheet, carrying it around a drum past a reading head, and ejecting it to be grasped virtually at the same place where it was inserted. In that apparatus the card or sheet is transported past the reading head in a one-way or non-reversing rapid cycle. (The data-bearing cards may be of various lengths and widths. Also, the cards may be quite thin, so that the terms "card" and "sheet" are generally interchangeable.)

The previous apparatus is capable of processing cards that may be somewhat wrinkled or otherwise damaged, within limits. The data-bearing surfaces of the cards are carried past the reading head so as to have prescribed spacing from the face of the reading head. The cards approaching the reading head are quickly shifted into alignment with a side guide, so that the columns of data are properly related to sensing elements of the reading head. The feed mechanism as a whole is highly dependable and it is remarkably compact. That apparatus has proved eminently successful.

The present invention is concerned with a card feeder and with a data reader embodying many of the same features and having the foregoing capabilities. The illustrative embodiment of the invention detailed below and shown in the accompanying drawings can be substituted for the previous apparatus. In many respects, the novel apparatus of the present invention is an improvement over the previous apparatus. The novel apparatus detailed below involves far fewer parts and is correspondingly cost-reduced, while retaining and in some respects improving on the operating characteristics of the previous apparatus.

The illustrative apparatus has a common opening in an enclosure at which data-bearing cards are inserted and where they are ejected. A rotary drive member within the apparatus advances the inserted cards along a path from the entry throat and around the rotary drive member to the ejection port adjacent the entry throat. The path includes an approach region, a read region where a data reading head is located, and a delivery region between the reading head and the ejection port. The rotary drive member has a peripheral elastomeric ring that presses inserted cards against a stationary outer guide segment in the approach region and propels the cards or sheets past the reading head. The elastomeric ring also presses the cards against a stationary outer guide segment in the delivery region, to withdraw the cards from the read region and deliver them to the ejection port.

Referring still to the illustrative apparatus, the path of the cards or sheets arches away from the rotary drive member in the read region. There is an outer guide in the read region spanning the outer guide segments in the approach and delivery regions. There is also an inner guide spanning the read region, complemented by inner guides in the approach and delivery regions. All of these guides define a smooth continuous card-feed guide around the drive rotor to preclude bouncing of the card that could create sensing disturbances.

The inner guides in the approach and delivery regions are relieved, for example by slots, to allow the elastomeric ring to bear against and propel the sheets. The outer guides in the approach and delivery regions are relieved as by grooves to allow the elastomeric ring to expand outside the guide surfaces of the outer guides without rubbing contact when no card is present. The inner and outer guides spanning the read region are not relieved where the guides are arched away from the drive ring and toward the read head. The sensing elements of the card reader can be located anywhere along a row crossing the card feed path. The arched configuration of the path traversing the read region allows the row of data sensors to extend all across the feed path, yet the elastomeric ring does not rub the spanning guides.

Known data reading apparatus has a blackened roller opposite to the row of sensing elements. The contrast from darkness to brightness that occurs when the leading edge of a ticket passes the sensors is sometimes utilized for gating the sensing operation. Additionally, the darkness behind the ticket increases the contrast between dark and light sensed areas of a ticket and suppresses spurious response to dark and light areas on the back of the ticket. In the apparatus detailed below, the card is transported over a stationary inner guide, at the side of the feed path opposite the sensing elements. That guide incorporates a channel covered with light absorbing material, spaced from the card feeding path so that it is not rubbed and worn by the transported cards or sheets to be scanned.

The elastomeric ring could be a broad band or a simple O-ring if suitable additional means were provided to align the code columns of the cards or sheets with the sensors of the reading head. However, as a further aspect of the invention, the elastomeric ring acts with properly contoured outer guide segments to shift the cards or sheets into contact with a side guide and to adjust the cards or sheets into alignment with the side guide in the approach region and to maintain such alignment in the delivery region of the path. A particularly effective form of elastomeric ring is one that has an annular web extending from an innermost annular base portion outward to a rim; the rim is closer than the base portion of the web to the side guide and farther than the annular base portion from the rotor's axis; and the annular web that connects the rim and the annular base portion of the web bulges away from the side guides.

Dependable operation of the apparatus for large numbers of reading cycles is highly desirable. Inserted cards or sheets may carry fibers and other dirt into the apparatus and, accordingly, the apparatus is to be cleaned periodically. A novel aspect of the illustrative apparatus detailed below is the relationship of reading head and the entire card feeder, which is all easily made accessible for cleaning and restored accurately to the operative configuration without resort to adjustments or delicate techniques and virtually without tools.

The illustrative apparatus embodies various novel aspects more fully explained below and expressed in the appended claims. The nature of the invention and the foregoing and other novel aspects and advantages will be best appreciated from the following detailed description of the illustrative embodiment which is shown in the accompanying drawings.

In the drawings:

FIG. 4A is a fragmentary cross-section of the illustrative apparatus at the radial plane 4A—4A in FIG. 3;

FIG. 7 is a fragmentary cross-section of selected components of FIGS. 2–4 at the plane 7—7 in FIG. 4, presuming a sheet (not shown) to occupy the feed path;

FIGS. 8, 9 and 10 are diagrammatic greatly enlarged fragmentary cross-sections of the apparatus of FIGS. 2–7 as viewed at the planes 8—8, 9—9 and 10—10 in FIG. 7, at successive positions along the sheet-feeding path; and FIG. 11 is a diagrammatic cross-section of a modified sheet-feeding ring like that in FIGS. 8–10.

Figures 1, 1A, 1B:
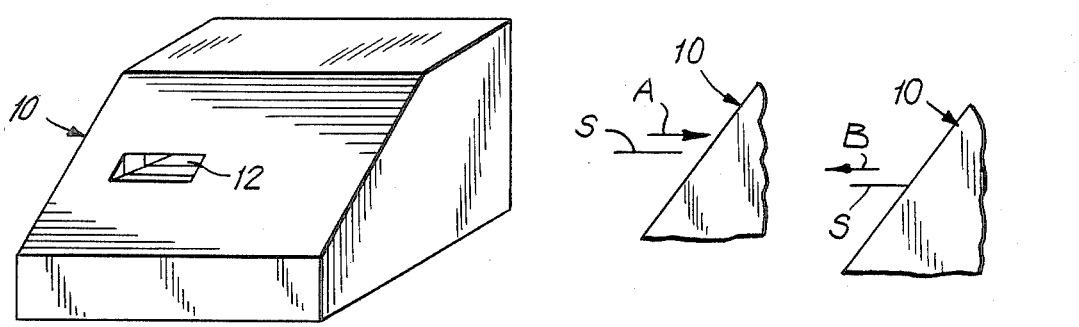
FIG. 1 is a perspective of the exterior of apparatus incorporating the invention.
FIGS. 1A and 1B are fragmentary left-side elevations of the apparatus of FIG. 1.

FIG. 1 shows apparatus 10 used to read or scan cards or sheets S bearing columns of coded data. Sheets are inserted manually at path A (FIG. 1A) into an opening 12 in the enclosure of the apparatus. The sheet is carried along a path that loops around a drum inside the apparatus. A moment later, it emerges along a reverse path B slightly below path A, in position to be grasped by the same hand that inserted it. The sheet travels in only one direction, resulting in higher speed operation and longer trouble-free life than sheet feeders that reverse a motor for ejecting an inserted sheet.

Figure 2:
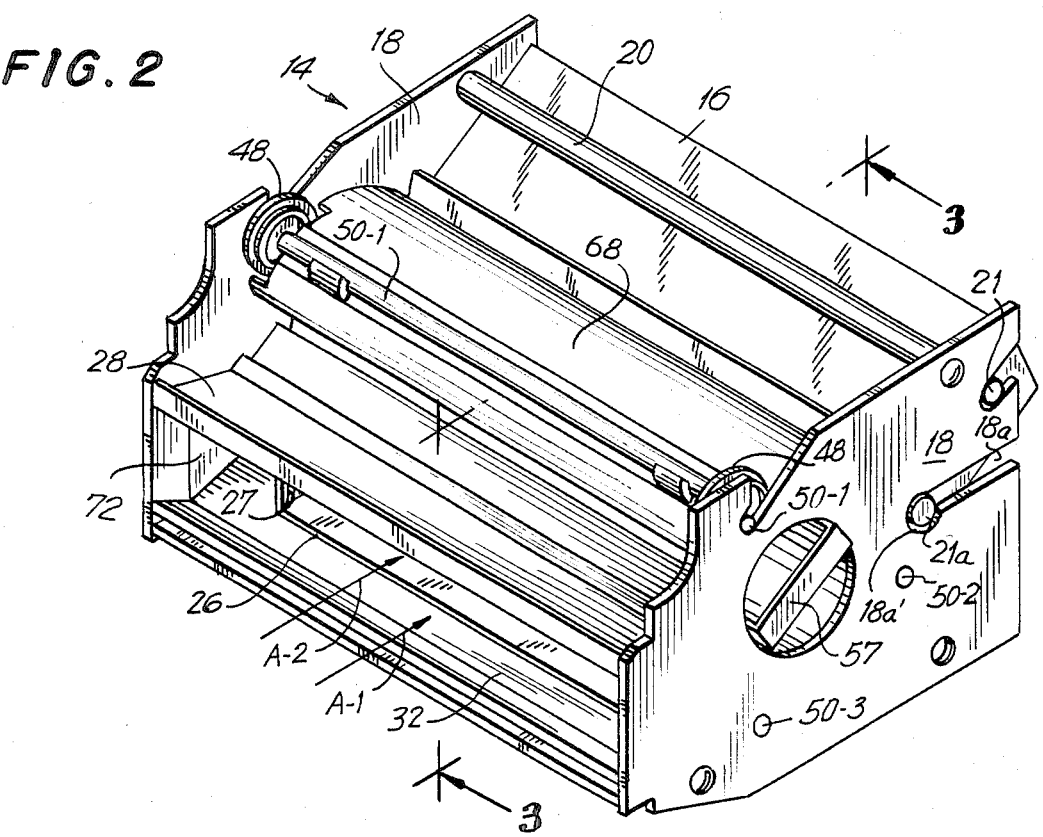
FIG. 2 is a perspective view of data-reading and sheet-feeding apparatus in the apparatus of FIG. 1.

FIG. 2 shows a sheet-feeding and data-reading unit 14 that is mounted inside the enclosure of apparatus 10, just inside aperture 12. Unit 14 includes a data-reading head 16 (see also FIG. 3) and a sheet-feeder between side frame-plates 18. Three tubes 20 (FIGS. 2 and 3) are held in place by screws through side plates 18, so that plates 18 and tubes 20 form a mounting frame. Pins 21 pfojecting from the ends of reading head 16 are received in frame plates 18. Pins 21 and outward-biased buttons 21a position head 16 accurately.

Sheets of different widths are handled interchangeably by the apparatus. Wide sheets enter a wide throat along path A-1 (FIGS. 2 and 3) whereas narrow sheets enter a narrow throat along path A-2. Two photoelectric sensor units are provided, one unit 22 at the left-hand margin of path A-1 and another unit 24 along the right-hand margin of a common path where paths A-1 and A-2 merge. (See also FIG. 5, where outlines of units 22 and 24 are shown.) Each photoelectric sensor unit includes a light-sensitive element at one side of the path and a light source at the opposite side of the path, to be interrupted by a margin of a sheet. A narrow inserted sheet interrupts the light beam of only unit 24 whereas a wide sheet interrupts the beams of both sensor units 22 and 24. Whenever unit 24 is activated, a drive motor is activated for a cycle long enough to complete an in-and-out sheet-feeding cycle. Activation of only sensing unit 24 provides a "narrow-sheet" signal to the data-processing apparatus (not shown) that responds to data reader 16. When a wide sheet is inserted and both sensor units 22 and 24 respond, the motor cycle is started and the two signals provide "wide-sheet" input to the same data-processing unit.

Figure 3:
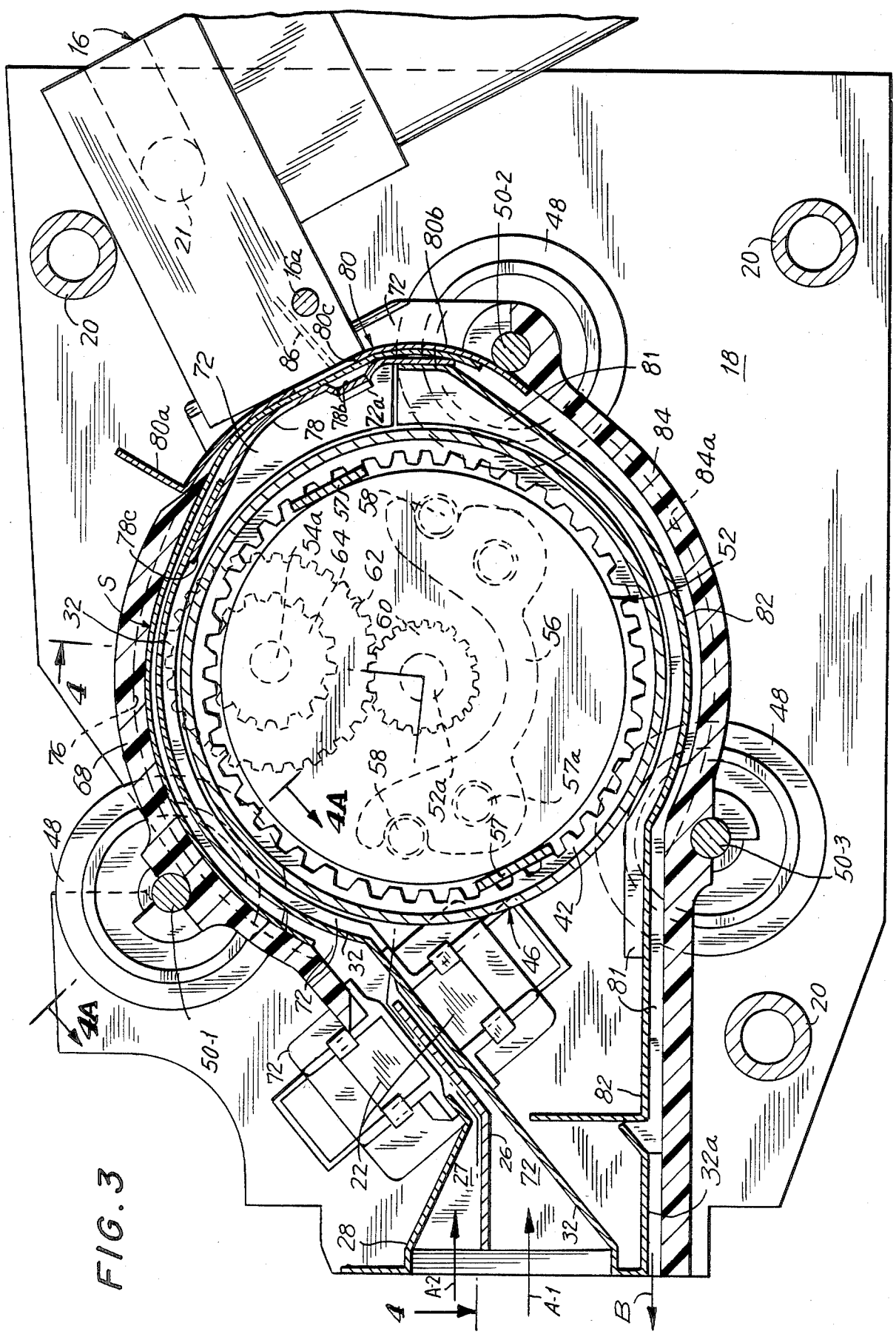
FIG. 3 is a cross-section of the apparatus of FIG. 2, drawn to larger scale, at the plane 3—3 in FIGS. 2 and 4.
Figure 5:
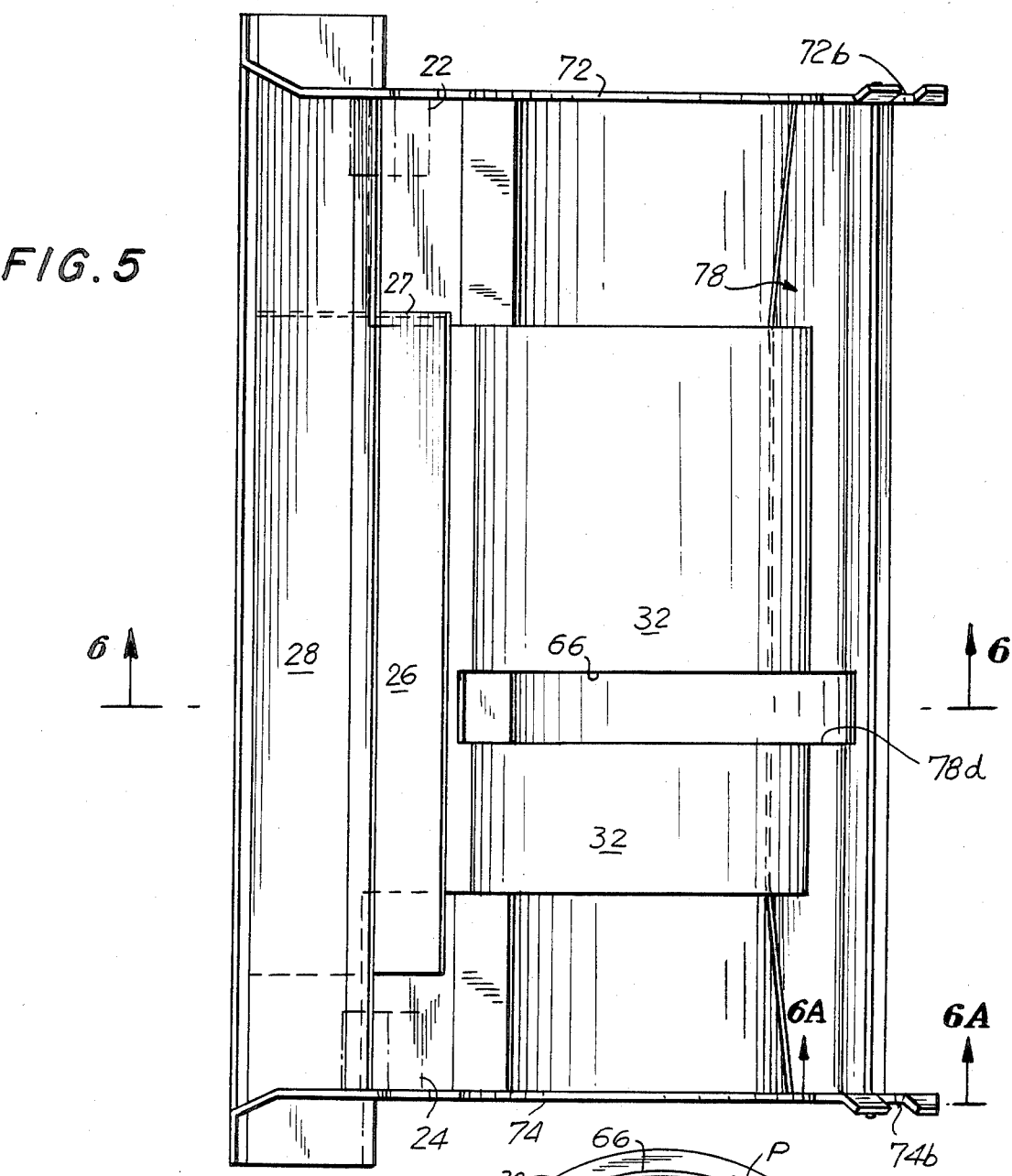
FIG. 5 is a top plan view of a subassembly of sheet-metal guide parts, forming a portion of the apparatus of FIGS. 2–4.
Figure 6:
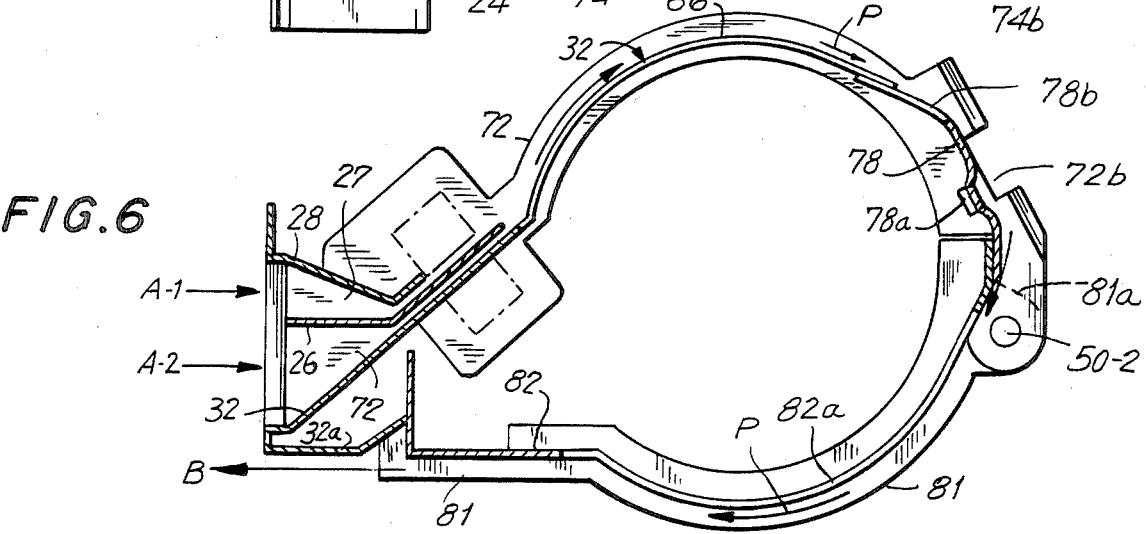
FIG. 6 is a cross-section of the sheet-metal guide subassembly at the plane 6—6 in FIG. 5.

In FIGS. 3, 5 and 6, sheet-metal parts 26 and 28 form lower and upper guides, respectively, of a throat for narrow sheets. Side guide 27 unites the left-hand margin of part 26 (FIG. 2) to part 28. Suitable means (not shown) fasten these sheet-metal parts—and others mentioned below—to one another.

Sheet-metal part 32 (FIGS. 2–6) forms the lower guide of the wide throat. Sheet-metal guide 32 extends continuously from the entry throat, upward and to the right (FIGS. 3 and 6) approximately one-third of the way around a cylindrical sector of the sheet-feeding path. The curved portion of member 32 forms an inner guide along part of the sheet-feeding path that is described further below.

Sheets are advanced along the sheet-feeding path by a rotary drive member 46 that includes cylinder or drum 40 bearing elastomeric ring 44. This ring may be molded of synthetic rubber. At the left in FIG. 4, an annular ring gear 42 is press-fitted into drum 40. At the opposite end, drum 40 is supported directly by three rollers 48.

Ring 44 has a tight fit on cylinder 40. Band 45 is adhered to cylinder 40, abutting ring 44, to prevent ring 44 from shifting along the cylinder to the left in FIG. 4. Ring 44 is discussed in detail below. Rotary drive member 46 draws sheets into the apparatus, carries the sheets bearing encoded data past reading head 16, and ejects the sheets.

There are three supporting rollers or wheels 48 at each end of drive member 46 (FIGS. 2,3 and 4A) rotatably carried by rods 50-1, 50-2 and 50-3 (FIG. 4A) supported by side plates 18. The hub 48a of each wheel bears against plate 18. The rims 48b of all of the rollers or wheels 48 form thrust bearings at the ends of rotary drive member 46. Those rims also provide rotary support for drive member 46 and locate its axis.

A small electric motor 52 (FIGS. 3 and 4) is mounted in the space within drum 40. A member 54 of molded plastic is fixed to the outer surface of left-hand frame plate 18. A spacer 56 of molded plastic separates the motor from frame plate 18. Bracket 57 (FIGS. 2 and 4) is screwed to the motor and extends to the opposite frame plate 18, serving as a handle to facilitate installation of the motor.

Pinion 60 is mounted on motor shaft 52a. Gear 62 and pinion 64 are a molded unit that rotates on shaft 54a. Gear 62 meshes with pinion 60, and pinion 64 meshes with the internal gear teeth 42a fixed to rotary drive member 46. Rotation of motor 52 is transmitted through the described speed-reduction gearing to drive member 46. Elastomeric ring 44 (FIG. 4) of drive member 46 extends through a slot 66 in inner guide 32. It bears against a sheet S and advances the sheet along the sheet-feed path P represented by the arrows in FIG. 6.

Referring again to FIG. 3, the narrow and wide throats at which sheets are inserted merge into a common sheet or cardfeed path along the outer surface of inner guide 32. A member 68 of molded plastic, supported on a rod 50-1, is an outer guide of the feed path opposite to the curved portion of guide 32. A groove 70 in outer guide 68 provides space for receiving the rim 44a (FIG. 8) of the elastomeric ring that moves outward to its unstressed condition without touching outer guide 68 when no sheet is present.

Sheet-metal parts 26, 27, 28 and 32, described above, form part of a subassembly shown in FIGS. 5 and 6. Parts 72 and 74 at the sides of the wide throat are secured to parts 28 and 32, unifying this subassembly. Arcuate portions of parts 72 and 74 extend above and roughly half-way around rotary drive member 46. Shaft 50-2 extends through holes in end portions of members 72 and 74 remote from the entry throats, pivotally supporting this subassembly. Part 72 is a side guide of the wide throat; and at the opposite side of parts 28 and 32, part 74 is a side guide of both the wide throat and the narrow throat. Sensor units 22 and 24 are mounted in holes in side members 72 and 74, where the throats converge into a common feed path approaching the rotary drive member 46.

There is a second subassembly (FIG. 6) below drive member 46, comprising a pair of side parts 81 and a wide sheet-metal part 82 extending arcuately below rotary drive member 46. Side parts 81 are aligned with side parts 72 and 74, respectively, in two planes near side frame parts 18. Ears 81a of side parts 81 are supported on shaft 50-2, so that the subassembly comprising part 82 and its two side supports 81 is pivotally supported on the same shaft 50-2 that supports the upper subassembly. Wide sheet-metal part 32 of the upper subassembly has a portion 32a that is bent back, below the bottom of the wide throat, providing the upper guide surface of an exit or ejection port that is described further below. The inner extremity of portion 32a of the upper subassembly abuts the ends of side members 81 remote from shaft 50-2 so that parts 81 are stops limiting the downward displacement of the upper subassembly.

Figure 4:
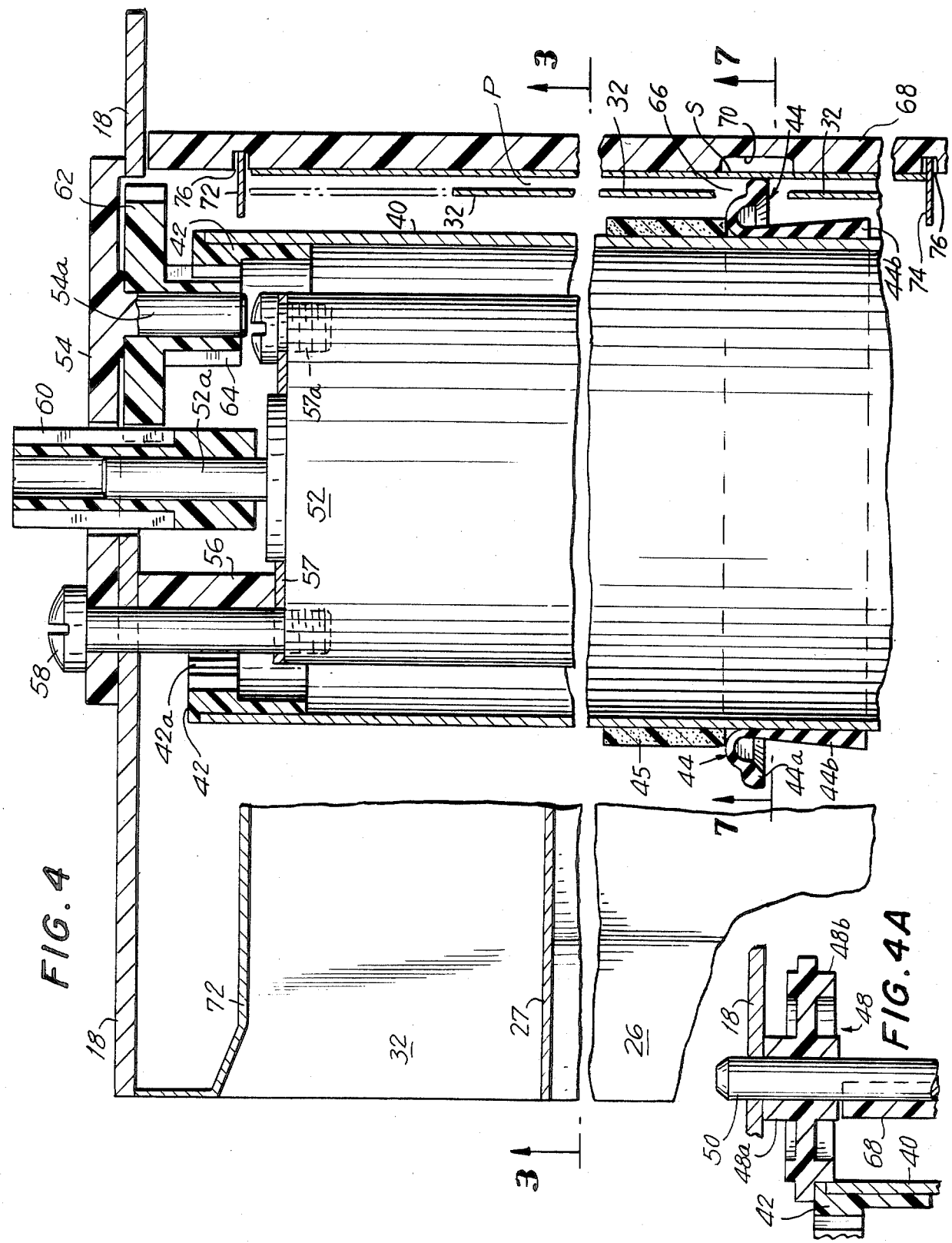
FIG. 4 is a fragmentary cross-section of the apparatus of FIGS. 2 and 3 as viewed from the multi-plane section line 4—4 in FIG. 3.

Referring to FIG. 3, member 68 above rotor 46 forms an outer guide segment of the feed passage. The arcuate portion of part 32, disposed between outer guide segment 68 and rotor 46, is an inner guide segment of the card-feed passage. Side parts 72 and 74 define the side margins of the passage around the top of rotor 46. Grooves 76 in outer guide segment 68 admit edges of parts 72 and 74 (FIG. 4). At the left in FIG. 3, outer guide segment 68 is pivotally supported on shaft 50-1, and at the right, the bottoms of grooves 76 in member 68 rest on the edges of parts 72 and 74 that are supported on shaft 50-2. The opposite side edges of member 68 abut side frame parts 18 (except for cut-outs for wheels 48 on shaft 50-1) so that the positions of side parts 72 and 74 are fixed relative to side frame parts 18.

Member 84 of molded plastic forms an outer guide segment of the feed passage or path below the rotary drive member 46. Arcuate member 82 of sheet metal, between outer guide segment 84 and rotary drive member 46, is an inner guide segment opposite to outer guide segment 84 below the rotor. Grooves 84a (FIG. 3) in outer guide segment 84 (like grooves 76 in outer guide segment 68) receive sheet-metal side parts 81 which, thus, form side boundaries of the feed path below the drive rotor 46. Member 84 is supported on shafts 50-2 and 50-3, and it extends not only below the drive rotor 46 but also below part 32a so that parts 32a and 84 provide opposite guide surfaces of the exit port.

Figure 6A:
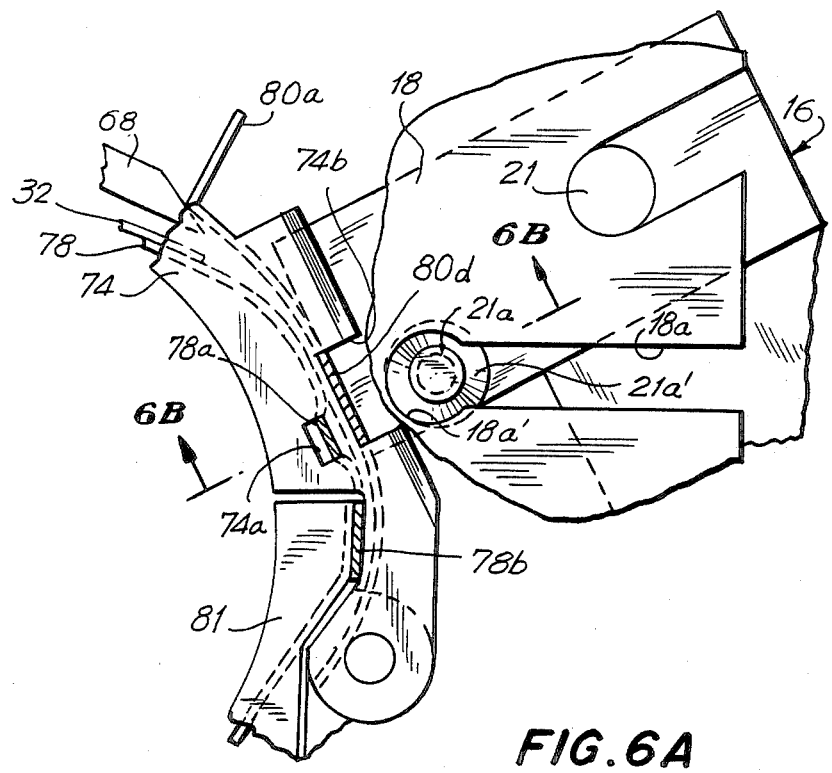
FIG. 6A is a fragmentary end view of the apparatus of FIGS. 1–4, shown partly in cross-section as viewed from the plane 6A—6A of FIG. 5.
Figure 6B:
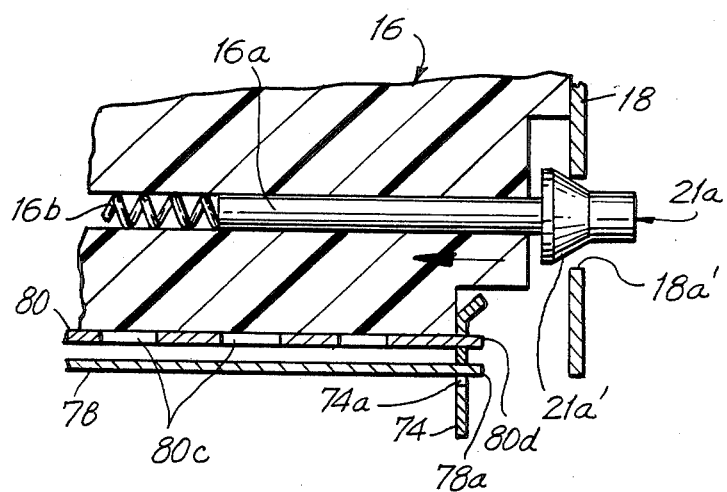
FIG. 6B is a fragmentary cross-section of the apparatus of FIGS. 1–6 at the plane 6B—6B in FIG. 6A.

The sector of the feed path above rotor 46 between outer guide segment 68 and inner guide segment 32 and the sector of the feed path below rotor 46 between outer guide segment 84 and inner guide segment 82 are spanned by inner guide 78 and outer guide 80, providing a sector of the feed passage that traverses the reading head 16. Guides 78 and 80 are sheet metal members that extend side-to-side from part 72 to part 74 and from side to side between side parts 81 in the read region. A locating projection 78a at the right of inner guide 78 (FIG. 6B) fits loosely in opening 74a (FIGS. 6A and 6B). A wide projection 78b at the same end of inner guide 78 is clamped between opposite edges of side parts 74 and 81. Inner guide 78 is shaped so that clamping of projection 78b biases projection 78a against the edge of opening 74a nearest to reading head 16. Projections at the opposite end of inner guide 78 that are the mirror images of projections 78a and 78b cooperate in like manner with opening 72a in side part 72 (FIG. 3) and with the upper and lower side parts 72 and 81.

Outer guide 80 has wide projections 80d received in notches 72b and 74b in side parts 72 and 74 (FIGS. 6 and 6A). Reading head 16 bears against outer guide 80 in the space between opposite-end projections 80d, pressing those projections against the long bottom edges of notches 72b and 74b. Edge portion 80a of outer guide 80, bent at a sharp angle to the rest of guide 80, imparts stiffness to the top margin (FIG. 3) of guide 80. This outer guide bears against a marginal portion of outer guide member 68 spaced from rod 50-1. This radially inward pressure on outer guide member 68 forces that member to seat against side parts 72 and 74 (FIG. 4). Pressure of reading head 16 against outer guide 80, holding the wide end projections of that outer guide against the bottom edges of notches 72b and 74b, locates the lower marginal portion 80b near or against shaft 50-2.

Reading head 16 contains a slide rod 16a (FIG. 6B) bearing a button 21a (also shown in FIG. 2). A conical cam portion 21a' this button is received in a circular enlargement 18a' at the inner end of a slot 18a in side plate 18 (FIGS. 2 and 6B). Head 16 is provided with mirror images of rod 16a and button 21a. The opposite frame plate 18 has a slot shaped like and aligned with slot 18a, 18a' to receive the mirror-image button. Spring 16b provides outward bias for the rods that carry the respective buttons. The dimensions of the parts are such that conical cams of the buttons press the reading head 16 toward and against outer guide 80 and thus press the end projections of guide 80 against the long bottom edges of the notches in side parts 72 and 74. This radially inward pressure of head 16 on outer guide 80 is also effective to press the right-hand portion of outer guide 68 (as seen in FIG. 3) against the outer edges of side parts 72 and 74 (FIG. 4).

In the assembled condition of the apparatus, side parts 72 and 74 embrace a projecting portion of head 16, as shown in FIG. 6B. Accordingly, a card having a side edge pressed against side part 74 (as described below) has its columns of coded data aligned with sensing elements in head 16 and with slots 80c.

Reading head 16 is released for removal by pressing buttons 21a inward far enough for the reduced-diameter end portions of the buttons to slide in slots 18a. After head 16 is removed, outer guide 80 can be removed, and outer guide 68 can be removed by shifting it together with shaft 50-1 and its rollers 48 upward and to the right (FIG. 3) along slots in frame plates 18. The throat assembly and side parts 72 and 74 and inner guides 32 and 78 can be swung upward around shaft 50-2 as a pivot. In this condition, all the guide parts in the approach region of the feed path between the entry throats and the reading head, and the guide parts in the read region, as well as the sensing face of the reading head, are freely accessible for cleaning. The same quick release is useful in order to remove a card if jamming occurs.

Motor 52 is released for removal by removing screws 58, and drum 40 is then free to be lifted away. The lower inner guide 82 in the delivery region, supported on shaft 50-2 by side parts 81, can then be swung up and away from outer guide member 84.

All of the inner areas of the apparatus are thus readily released and opened up for cleaning. If only the approach region and the read region need attention, no tools whatever are required; and if the entire apparatus is to be opened up, only a screwdriver is needed.

Returning the apparatus to operation involves a reverse of the described procedure. When completed, the parts are all in repeatably accurate positions. The clearance between inner and outer guides 78 and 80 is established by the upper edges of holes 72a and 74a and the long bottom edges of notches 72b and 74b (FIG. 5). Surface-finishing operations on the sensing face in the manufacture of sensing head 16 may remove varying amounts of material; yet the contact of the sensing face of head 16 against outer guide 80 assures an essentially consistent, repeatable gap through holes 80c (FIGS. 3 and 6B) between the sensing face and the code-bearing surface of a card. The cards are pushed by drive member 46 in the approach region and tend to wipe against the inner arched surface of outer guide 80. Even if such wiping of the card against guide 80 did not occur, the action of inner guide 78 in guiding the cards past the reading head limits the gap between the sensing face and the data-bearing surface of the card so as to assure dependable sensing. The clearance between inner and outer guides 78 and 80 of a few thousandths of an inch more than the thickness of the cards is determined largely by the spaces between the lower edges of notches 72b and 74b and the upper edges, respectively, of holes 72a and 74a in side parts 72 and 74 against which the end projections of inner guide 78 are biased. Side parts 72 and 74 are stampings, so the spaces between each hole and the related notch are accurately duplicated in production, and the only other variable determining the gap between guides 78 and 80 is the end-to-end straightness of those guides. This clearance allows the cards to be propelled easily through the outward-arched read region along the card-feed path, yet limiting the maximum sensing gap.

The entire card or ticket feeding and sensing apparatus comprises a readily removable reading head 16; an upper outer guide member 68 in the approach region; a lower outer guide member 84 in the delivery region; a removable card-driving drum 46 with its internally contained motor 52; a two-part assembly (FIG. 6) hinged at shaft 50-2 that opens like a clam-shell, comprising the entry throats and the inner and outer guides 32, 78 and 82; and the outer guide 80. In the operating configuration of the mechanism, outer guide 80 is pressed against its end supports 72 and 74 by the sensing face of reading head 16. Shafts 50-1 and portion 80a of outer guide 80 locate outer guide segment 68, pressing it against the edges of side parts 72 and 74. These side parts are unified by part 32 that forms the upper inner guide and part of the entry throat, and by throat part 28. Pressure of outer guide segment 68 causes the lower end portion 32a of upper inner guide 32 to press against spaced-apart side parts 81 that are unified by lower inner guide 82. Pairs of side parts 72/81 and 74/81 clamp end projections 78b and bias end projections 78d against the outward edges of holes 72a and 74a, in turn locating the upper marginal portion 78c of inner guide 78 underneath the upper end of inner guide 32.

The whole mechanism is precise where precision is needed, involving no adjustments, and it can be opened and made largely accessible as for cleaning without any tools, and it is fully opened with the use of only a screwdriver. Accordingly, apparatus of this kind can be installed widely at a large number of locations, and can be maintained by virtually unskilled attendants.

As noted above, inner guide 32 has a slot 66 that serves as a relief allowing elastomeric ring 44 to press a sheet S against outer guide 68. Inner and outer guides 78 and 80 which extend from the approach region to the delivery region, thus spanning the read region, are arched away from cylinder 40 so as to be beyond the reach of elastomer ring 44 at read head 16. However, there is a portion of inner guide 78 that underlies inner guide 32. Accordingly, slot 66 in inner guide 32 for elastomeric ring 44 is extended as slot 78d (FIG. 5) in inner guide 78, extending the relief for ring 44 to be free of contact with guide 78 at all times.

A card or sheet enters the apparatus at arrow A-1 or A-2 (FIG. 3) and travels along a path that is fixed by the inner and outer guides. An essentially continuous inner guide surface is provided by sheet-metal parts 32, 78 and 82. An essentially continuous outer guide surface is provided by molded guide segment 68, outer guide 80 that spans the read region of the path, and molded guide segment 84. Rotor 46 causes elastomeric ring 44 to drive a sheet along guide 68 in the approach region and to propel it into the reading region; and rotor 46 causes elastomeric ring 44 to drive each sheet along outer guide segment 84 in the delivery region and to withdraw each sheet from the reading region between inner and outer guides 78 and 80 that span the space between the approach and delivery region.

Reading head 16 includes a light source (not shown) that transmits light along fiber optic bundles to the card path separately at each of the columns of the cards, and ends of other fiber optic bundles at the same column locations extend to light sensors (not shown) in the head. The bundle of light-emitting optic fibers and the bundle of pick-up fibers for each column at the reading face may be combined, to form composite bundle 86. The bundles slant in relation to the sheet path so that light incident at a card face is not reflected to the pick-up fibers from a darkened code mark even when that code mark is shiny. However, light that reaches a light code area of a card is scattered so that part of the incident light is returned to the pick-up fibers. Further details of the reading head are disclosed in my application Ser. No. 553,846 and are incorporated here by reference.

The code-bearing surface of a sheet or card facing the reading head is spaced from the reading head by the thickness of outer guide member 80, or the spacing may be slightly larger for sheets that slide against inner guide 78. An opening 80c in member 80 is provided for the incident and returned light at each column of a sheet or card. Guide 78 confines the cards close to guide 80, for providing uniform scanning conditions.

A channel 78a is formed in inner guide 78. The bottom of the channel is recessed from the sheet-guiding areas of guide 78. The bottom of channel 78a is aligned with the row of light-emitting bundles and the bundles of the sensing elements in the reading head. The bottom of the channel is covered with a matte black light-absorbing material. This light-absorbing band is in sharp contrast to the leading margin of a card (useful in developing a gating signal) and light absorbtion behind the card tends to suppress spurious response to marks on the back of even relatively thin cards or sheets.

The space between the inner guide surface afforded by member 78 and the opposite surface of outer guide part 80 is only a few thousandths of an inch greater than the thickness of a card. The curvature of the card path approaching the reading head between inner and outer guides 32 and 68 and between inner and outer guides 78 and 80 enforces curvature of the cards. Imposing such curvature on the cards has an inherent effect of flattening wrinkles that may be present in a card to be read. The firmly limited separation between guide parts 78 and 80 and the fixed thickness of outer guide 80 provide assurance that the data-bearing surface of a card will be disposed at a prescribed distance from the reading head, within a minimal latitude of variation.

The composite outer and inner guide surfaces provided by outer guide parts 68, 80 and 84 and inner guide parts 32, 78 and 82 establish a card passage or path from the entry throat, looping around drive member 46 to carry the coded areas past the reading head, and to an eject port (arrow B, FIG. 3), to be grasped by the same hand in the same position as was used to insert the card.

The card is dependably transported along the path by elastomeric ring 44. The inner guide parts are relieved by slots as required, so that the elastomeric ring can bear against and propel the cards or sheets. The outer guide parts are also relieved, by slots or grooves, so that the elastomeric ring 44 does not rub against any part of the sheet-guiding structure. In this way, excessive wear of ring 44 is avoided, and the frictional quality of the ring that promotes driving contact with sheets is protected.

Alignment of the columns of a card along the feeding path of the cards or sheets with the locations of the sensing elements of the reading head is particularly critical when there is high density of columns across the card or sheet. Additionally, since each row of data on the sheets is perpendicular to an edge of the sheet, the row of data will be aligned with the row of sensing elements only if the side edge of each sheet is aligned with the feed path.

The foregoing card feeding and reading apparatus represents a viable card feeding and code-reading apparatus in situations where the side frame parts can provide acceptably accurate alignment of the data columns on the cards with the sensing elements of the reading head and alignment of each row of code elements on a sheet with the row of sensing elements of the head.

The apparatus thus far described is improved for achieving rapid and accurate alignment of the cards against a side guide, both for improved alignment of the coded columns with the code-reading elements of the reading head and for highly reliable in-and-out feeding of cards, even cards that are damaged (within limits). For this purpose, elastomeric ring 44 has a cross-section of the kind such that pressing a segment of the rim inward radially produces a corresponding shift of that pressed segment of the ring sidewise toward a side guide. As seen above, the ring presses the card against the outer guide 68 and propels the card around the curved path from the entry throat to the reading head. The ring also presses the card against the outer guide 84 for ejecting the card after it has been read. Each of these outer guides is shaped so that the outer guide presses each incremental length of the rim progressively closer to the ring's axis over a long arc. Successive small lengths of the rim act on a corresponding succession of small incremental lengths of a card. This action, which is distributed over a long arc of contact, tends to shift the card toward a guide along a side of the feed passage and, once the card reaches the side guide, this action tends to correct angular misalignment of a card by aligning the edge of the card with the side guide. Part 74 and a part 81 at the same side of the card-feed passage form the side guide means. These parts 74 and 81 have guide surfaces in a common plane transverse to axis of rotor 46.

A card may have reached its fully aligned condition, having been shifted into contact with a side guide and then having been adjusted angularly against the side guide, while the card continues to be propelled along its path. The sidewise biasing action of the incremental segments of the elastomer ring 44 on the card is sustained after such full adjustment of the card has been completed. Two forms of ring are considered below, differing mainly in their characteristics in relation to a card after it has been shifted against the side guide.

FIG. 7 represents the condition of elastomeric ring 44 in the various regions along the card-feed passage and between the end and the start of the feed path.

In FIG. 7, cylinder 40 of drum 46 is shown partially encircled by upper guide 68 and lower guide 84, these parts being represented in their operative relationships. Arrow A represents the direction of a sheet entering the sheet-feeding passage. A sheet traveling around cylinder 40 is pressed against the sheet-engaging surfaces 68a and 84b of the upper and lower outer guides 68 and 84 by the outer rim 44a of ring 44. In FIG. 7, rim 44a is shown separated from surfaces 68a and 84b by the thickness of a sheet. If no sheet were present, rim 44a would be unrestrained and would extend into groove 70 of the upper outer guide 68 and into groove 84a of the lower outer guide 84.

Between the exit and entry locations B and A, rim 44a is unconstrained, and it shifts outward as shown. See also the broken-line representation in FIG. 8. As a sheet is propelled into and along the sheet-feed passage, the sheet and outer guide 68 press each succeeding incremental length of rim 44a radially inward, i.e. toward the axis X (FIG. 7) of cylinder 40 as established by rollers 48. In the read region (between the approach and delivery regions of outer guides 68 and 84) inner guide 78 is arched outward and is beyond the range of ring 44 in its unconstrained state. Ring 44 and outer guide 68 propel each sheet through the read region and into the delivery region, where ring 44 presses each sheet against lower outer guide 84. As a sheet enters the delivery region, each succeeding incremental length of rim 44a is pressed radially inward or toward axis X of cylinder 40 (FIG. 8).

The guide surface 68a of the outer guide segment 68 in the approach region is not spaced at a uniform or constant radius from axis X. Rather, surface 68a becomes progressively closer to axis X along the feed path from radius R1 to radius R2. An effective and practical way of introducing this configuration of surface 68a is to form that surface as an arc of a cylinder having radius $R1=R2$, where the centers $X_1$ and X are at virtually the same distance (R1) from the entry point of a sheet along surface 68a and where center $X_1$ is a definite small distance farther than center X from the end-point along cylindrical surface 68a of the feed path. Radius R1 is slightly less than the unconstrained radius of rim 44a (FIG. 8) from center X. The resulting surface 68a causes successive incremental lengths of rim 44a that bear against and propel a sheet along outer guide 68 to become displaced progressively inward toward axis X along the path between the entry and exit ends of outer guide 68.

Correspondingly, guide surface 84a of outer guide 84 is here formed as an arc of a cylinder having a radius R3=R1 at the sheet-entry point along outer guide 84, which equals the radius R4 at the exit end of the cylindrical arc. The center $X_2$ of radii R3 and R4 is virtually at the same distance as axis X from the sheet entry point along the surface 84a and center X2 is at a small definite distance farther than axis X from the exit end of the cylindrical arc of guide 84.

The described apparatus acts, in practice, to shift inserted sheets (as roughly aligned by the side guides of the entry throats) into proper columnar alignment for scanning by the reading head 16. This action may be considered as involving two factors. A sheet that enters the passage between member 68 and ring 44 is to be shifted into contact with side guide 74. Additionally, if the side edge of the sheet is disposed at a small angle to side guide 74, the sheet is to be adjusted angularly so that its side edge extends along side guide 74.

The manner of operation, as envisioned, is indicated in FIGS. 8–10. These figures represent the cross-section of ring 44 in relation to outer guide 68 and side guide 74, as viewed in radial planes containing the axis of cylinder 40 and of ring 44. The cross-section of ring 44 includes rim 44a, a mounting band 44b on cylinder 40, a web 44d extending inward from rim 44a, and an annular base 44c of web 44d, where the web joins band 44b.

In FIG. 8, a small increment of the length of rim 44a is in the position represented in broken lines when no sheet is present at that increment between ring 44 and guide 68. That increment of ring 44 is in its unrestrained, unstressed condition. As a sheet is first being drawn into the space within outer guide 68, it is considered that an elemental length of rim 44a is moved in the direction of arrow C (FIG. 8) to the position represented in full lines.

During the advance from the entry point ($R_1$ in FIG. 7) to the exit point ($R_2$ in FIG. 7) of outer guide segment 68, rim 44a is pressed progressively closer to drum 40 (lower in FIGS. 8, 9 and 10). Rim 44a has a good grip on the surface of the sheet, both in propelling the sheet around cylinder 40 and in resisting sliding of rim 44a side-to-side relative to the sheet. Between rim 44a and the broad supporting band 44b of ring 44, the radial cross-section of the elastomeric ring in a plane containing the ring's axis includes a web 44d and a base 44c where web 44d joins band 44b. This cross-section of ring 44 may be considered to include two components. First, it may be considered that there is a "column" component between each increment of length of rim 44a and the opposite elemental length of base 44c, interconnected by web 44d. This "column" component resists compression. Second, web 44d introduces a yielding component in the "column".

The rim 44a is closer than base 44c to side guide 74. Consequently, as an increment of length of rim 44a is pressed inward toward the axis, the "column" component tilts about base 44c so that the depressed increment of length of rim 44a shifts toward side guide 74. Its frictional grip of a sheet tends to shift the sheet toward the side guide. This occurs initially when a sheet enters outer guide 68 at radius R1, FIG. 7, causing rim 44a to be depressed from the dotted-line position to the solid line position in FIG. 8. Rim 44a propels a sheet along the path and each elemental length of rim 44a becomes progressively more depressed and sheet S is shifted progressively closer to side guide 74, along arrow D (FIG. 9).

The sheet presumably reaches the side guide at some point along outer guide 68, short of radius $R_2$ at the exit end of that guide. If the "column" component of the ring were rigid, the rim would shift (arrow E) to the dotted-line configuration of FIG. 10. Between the point along the path where the margin of the sheet first reaches side guide 74 and the dotted-line end-point condition of the rim in FIG. 10, two different actions could occur. If the friction grip of rim 44a were weak, rim 44a could slide harmlessly sidewise across the surface of sheet S toward side guide 74. A weak frictional grip of rim 44 and sheet S is objectionable, as providing only weak drive to propel a sheet along its path. If rim 44a were to have a firm frictional grip on the sheet, the portion of the sheet engaged by that elemental length of rim 44a would be forcibly driven toward side guide 74 after the sheet has been shifted against the side guide. The consequence would be either buckling of the sheet between rim 44a and side guide 74, or abrasive wear on rim 44a which would have to skid. At any rate, excessive edge pressure of the sheet causes premature wear of the side guides and appreciably affects the ability of a small motor to propel the sheet, both effects proven in early tests.

By introducing a yielding component in the web of the elastomeric ring, the material chosen for the ring can be one that provides secure frictional grip to the sheets and yet rim 44a is not forced to its dotted-line position of FIG. 10; instead, rim 44a can be arrested because of its grip on a sheet arrested by the side guide, without imposing such sidewise force on the sheet as to cause buckling, or hard driving conditions.

Rim 44a tends to remain circular, in a plane. After a portion of a sheet is arrested by engagement with side guide 74, and when the elemental length of rim 44a in engagement with the sheet is arrested, trailing portions of the rim are depressed less. Those trailing portions of rim 44a are correspondingly spaced progressively farther from side guide 74. Trailing portions of the sheet are shifted against side guide 74 as rotor 46 propels the sheet along its path. The side margin of a sheet is thus carried into contact with side guide 74 and into angular alignment with the side guide. As this action proceeds, it is reasonable to consider web 44d as becoming distorted to accommodate the condition of the sheet in relation to the side guide. This much is clear: Using ring 44 of a material having a good frictional grip on the sheet, a sheet is firmly impelled along its path, even sheets that are wrinkled relatively prominently; the sheets are consistently aligned with the scanning head both for alignment of each data column with a sensing element 86 and for alignment of each row of data marks across the sheet with the row of sensing elements 86; and buckling of sheets between ring 44 and side guide 74 does not occur, disregarding excessively thin or supple sheets or cards.

As portions of a sheet start to leave the exit ends of inner and outer guides 32 and 68, successive elemental lengths of ring 44 expand to their unstressed condition.

The sheet's orientation is firmly determined by the long arc of ring 44 between radii R1 and R2. The effect of each elemental length of rim 44a on the portions of sheets leaving guide 68, as the local stress in ring 44 declines, is conceived as a weak wiping stroke with little tendency to draw a sheet away from the side guide.

The effect of ring 44 in the approach region along outer guide 68 is to draw an inserted sheet into the apparatus and to propel it into and through the outward arching path between guides 78 and 80 in the read region. The leading edge of sheet S is shown in FIG. 3 approaching guide surface 84a of outer guide 84 in the delivery region. When the sheet enters the delivery region of outer guide 84, virtually the same action of ring 44 as described above for guide 68 occurs again, with one exception. Presumably the sheet is aligned in side-to-side position and angularly with the side guide 81 at the right of the apparatus. The guide surface of that side guide 81 is coplanar with the guide surface of side guide 74. Therefore, little if any sidewise shift of a sheet may be expected between the entry and exit ends of guide surface 84a, at radii R3 and R4 of FIG. 7. The yielding quality that is imparted by bulging web 44d to ring 44 assures accommodation between the elastomer ring and the sheet that is arrested by side guide 81 against being shifted sidewise, despite a firm frictional grip of rim 44a with the sheet. Alignment of the trailing end of the sheet is maintained as it is drawn out of the read region, buckling of the sheet is avoided, and smooth ejection of the sheet ensues.

A single elastomer ring has proved highly effective for the described purposes. Use of two spaced-apart elastomer rings on drum 40 is counter-indicated. Both rings would, of course, operate at the same peripheral speed. For this reason, the action of one of the rings in attempting to shift a sheet angularly into alignment with side guide 74 would be impeded by the drive grip of the other ring on the sheet. Each ring would have the same forward-driving frictional grip on the sheet, and those equal forward-feed grips of the sheet would impede the required tilting displacement of an angularly misaligned sheet.

An elastomer ring not specially shaped to perform the alignment function (e.g. an O-ring) would propel a sheet or card past a reading head from the approach region within outer guide 68 and out of an ejection zone within outer guide 84. Other means for aligning the data columns on the sheets with sensing elements of head 16 would be provided. Here, ring 44 is an excellent, durable and remarkably simple sheet aligning a device which also propels the sheet. As an alternative aligning and sheet-propelling ring, see FIG. 11. Primed numerals in FIG. 11 are applied to corresponding elements in FIGS. 8–10 that are the same except in respect to the shape of the ring's cross-section.

Rim 44a' has frictional driving functions in relation to sheet S comparable to rim 44a, both with respect to the sheet-propelling function of the rim and its sidewise biasing effect on the sheet. Between rim 44a' and base 44c', the cross-section of ring 44' has what amounts to a column of elastomer that may be flexed toward the ring's axis and it may be distorted from each incremental portion of the ring's circumference to the next. However, there is no bulged web between rim 44a' and its base 44c'. Rim 44a' is effective to shift a sheet sidewise as the rim is pressed radially inward by an outer guide segment 68 or 84. As it is depressed through a distance D-1, a relatively firm sidewise displacement D-2 of the rim develops. The ring 44' is formed of an elastomer so that it can assume various degrees of distortion around its circumference, but little contraction is possible between portions 44a' and 44i c'.

The form of ring in FIG. 11 produces sidewise forces tending to buckle a thin ticket being fed along and against side guide 74. Such buckling can be avoided by limiting the use of the apparatus to tickets of thick stock and by limiting the frictional quality of the rim. When that is done, the rim is forced to skid relative to the ticket after the ticket is arrested by side guide 74, and the skidding causes the rim to become worn. Despite these disadvantages, the form of elastomer ring in FIG. 11 is capable of propelling and aligning sufficiently stiff cards.

As is noted above, the apparatus is easily opened up for service. This is performed by first depressing the buttons 21a so as to release reading head 16 for removal, then removing the approach outer guide segment 68 and removing bridging outer guide 80, and swinging the inner guides 32 and 78 away from rotor 46 which also provides access to the inner ends of the entry throats. At this point most of the parts that may need cleaning are freely accessible. Screws 58 may be unscrewed so that motor 52 and rotor 46 may be removed; and then the inner delivery guide 82 may be swung up and away from delivery outer guide 84 so that all parts of the sensing and card or ticketfeeding mechanism are freely accessible.

Return of the mechanism into operation involves the reverse procedure. All relationships are restored without resort to adjustments and without resort to critical accuracy in the manufacture of the parts. The surface along outer guide parts 68, 80 and 84 is virtually continuous and it is free of bumps which could cause sensing difficulties. The inner guide surface along approach inner guide 32, bridging guide 78 and delivery inner guide 82 is also free of potentially troublesome bumps. The configuration of the card-feed path in relation to the elastomeric ring 44 for inducing alignment of the cards with side guide 74 is restored, and reading head 16 again fits against side guide 74. Finally, the reading head is pressed against outer guide 80 so that the minimum sensing gap between the cards and the sensing face of the reading head is reestablished without depending on precise dimensions of sensing head 16. Additionally, the bridging inner guide 78 is biased toward outer guide 80, against stop edges of holes 72a and 74a, to limit the space between the bridging inner and outer guides 78 and 80 along the read region of the card-feed path.

The foregoing detailed description of the illustrative apparatus as an embodiment of the various aspects of the invention may be modified variously and may be used in other applications by those skilled in the art, and some of the novel aspects may be used apart from others. Consequently, the invention should be construed broadly in accordance with its true spirit and scope.

What is claimed is:

1. Data reading apparatus including a rotor and means for driving said rotor, sheet guiding means for guiding a sheet from an entry point along a path partway around said rotor, and a reading head disposed along said path and spaced from said entry point, said sheet guiding means including prominently arcuate stationary outer guide means curved about said rotor, and said rotor having a peripheral elastomeric ring for pressing a sheet against said outer guide means and for driving the sheet along said prominently arcuate outer guide means, wherein said sheet guiding means additionally includes prominently arcuate stationary inner guide means interposed between said outer guide means and said rotor, said inner guide means being so relieved as to enable said elastomeric ring to press a sheet against said outer guide means.

2. Data reading apparatus as in claim 1, wherein said prominently arcuate outer guide means includes first and second stationary outer guide segments spaced apart along said path, and wherein said inner guide means includes first and second stationary inner guide segments spaced apart along said path and disposed opposite to said first and second outer guide segments, respectively, said inner guide segments being relieved for enabling said elastomeric ring to press a sheet against said outer guide segments, said reading head being disposed at a zone along the path between the opposite first outer and inner guide segments and the opposite second outer and inner guide segments.

3. Data reading apparatus as in claim 2, wherein each of said outer guide segments is relieved to provide a groove in which a peripheral portion of said ring is received when there is no interposed sheet.

4. Data reading apparatus as in claim 2, wherein said sheet-guiding means includes side guid means along said outer guide segments providing a sheet-edge guide in a plane transverse to the rotor's axis, and wherein said elastomeric ring is adapted by its cross-section to become so deformed locally that, when an elemental length of the ring's sheet-engaging rim is depressed toward the rotor's axis, that elemental length of the ring's rim also tends to be shifted toward said transverse plane, the sheet-engaging surface of each of said first and second outer guide segments being progressively closer to the rotor's axis along the path in the direction of advancing travel of a sheet, for adapting the ring to apply bias to successive sheets so as to bias a side edge of each sheet against and into alignment with said sheet-edge guide.

5. Data reading apparatus as in claim 4, wherein said sheet guiding means includes outer and inner sheet guides disposed opposite said reading head and spanning the space between said first and second outer guide segments and said first and second inner guide segments, said elastomeric ring serving to push sheets along the path to the reading head and serving to draw sheets along the path from said reading head in a smoothly continuing sheet-feeding motion, said inner and outer guides defining a portion of said path traversing the reading head that is out of the range of said elastomeric ring.

6. Data reading apparatus as in claim 2, wherein said sheet guding means includes side guide means along said outer guide segments providing a sheet-edge guide in a plane transverse to the rotor's axis, and wherein said elastomeric ring has an annular wall having an annular base portion and a rim and an annular web from the base portion to the rim, the rim being closer than said base portion to said transverse plane and being farther than said base portion from the rotor's axis, the sheet-guiding surface of each of said outer guide segments having a sheet-engaging surface that is progressively closer to the rotor's axis along said path in the direction of advancing travel of a sheet, for adapting the ring to bias successive sheets, including a side edge of each sheet, against and into alignment with said sheet-edge guide.

7. Data reading apparatus as in claim 6, wherein said web, as viewed in a radial plane containing the rotor's axis, bulges away from the transverse plane of said sheet-edge guide.

8. Data reading apparatus as in claim 1 or 2, wherein said sheet guiding means includes inner and outer guides spanning the zone where the reading head is disposed, said spanning guides being spaced from said rotor so as to locate the path of the sheets traversing the reading head out of range of said elastomeric ring, said elastomeric ring serving to push sheets along the path into the zone where the reading head is disposed and to draw sheets out of that zone.

9. Data reading apparatus, including a rotor and means for driving said rotor, sheet guiding means for guiding a sheet from an entry point along a path partway around said rotor, and a reading head disposed along said path and spaced from said entry point, said sheet guiding means including prominently arcuate stationary outer guide means curved about said rotor, and said rotor having a peripheral elastomeric ring for pressing a sheet against said outer guide means and for driving the sheet along said prominently arcuate outer guide means, wherein said sheet guiding means includes side guide means providing a sheet-edge guide in a plane transverse to the rotor's axis and wherein said elastomeric ring is adapted by its cross-section to become so deformed locally that, when an elemental length of the ring's sheet-engaging rim is depressed toward the rotor's axis, that elemental length of the ring's rim tends to be shifted toward said transverse plane, an extended portion of said outer guide means between said entry point and said reading head having a sheet-engaging surface that is progressively closer to the rotor's axis along said path in the direction of advancing travel of a sheet, for adapting the ring to apply bias to successive sheets so as to bias a side edge of each sheet against and into alignment with said sheet-edge guide.

10. Data reading apparatus as in claim 9 wherein, in the region along said path next following the portion of said sheet-engaging surface that is nearest said axis, the sheet guiding means is relieved so that pressure of said elastomeric ring against the front of a sheet is unresisted at the back of that sheet.

11. Data reading apparatus, including a rotor and means for driving said rotor, sheet guiding means for guiding a sheet from an entry point along a path partway around said rotor, and a reading head disposed along said path and spaced from said entry point, said sheet guiding means including prominently arcuate stationary outer guide means curved about said rotor, and said rotor having a peripheral elastomeric ring for pressing a sheet against said outer guide means and for driving the sheet along said prominently arcuate outer guide means, wherein said sheet guiding means includes side guide means providing a sheet-edge guide in a plane transverse to the rotor's axis and wherein said elastomeric ring has an annular wall having an annular base portion and a rim and an annular web from the base portion to the rim, the rim being closer than said base portion to said transverse plane and being farther than said base portion from the rotor's axis, at least an extended portion of said outer guide means between said entry point and said reading head having a sheet-engaging surface that is progressively closer to the rotor's axis along said path in the direction of advancing travel of a sheet, for adapting the ring to apply bias to successive sheets so as to bias a side edge of each sheet against and into alignment with said sheet-edge guide.

12. Data reading apparatus as in claim 4, wherein said web, as viewed in a radial plane containing the rotor's axis, bulges away from said transverse plane and wherein said rim is circumferentially continuous.

13. Data reading apparatus, including a rotor and means for driving said rotor, sheet guiding means for guiding a sheet from an entry point along a path partway around said rotor, and a reading head disposed along said path and spaced from said entry point, said sheet guiding means including prominently arcuate stationary outer guide means curved about said rotor, and said rotor having a peripheral elastomeric ring for pressing a sheet against said outer guide means and for driving the sheet along said prominently arcuate outer guide means, wherein said prominently arcuate outer guide means includes first and second outer guide segments spaced apart along said path, said reading head being disposed in a zone between said first and second outer guide segments, and wherein said sheet guiding means includes edge guiding means along said first and second outer guide segments, and wherein said elastomeric ring is adapted by its cross-section to have the sheet-engaging portion of its rim displaced toward said edge guiding means where such sheet-engaging rim is depressed toward the rotor axis, each of said outer guide segments being progressively closer along said path to the axis of the rotor, for developing progressively increasing effect of the elastomeric ring along each of said outer guide segments in biasing a sheet toward said edge guides.

14. Data reading apparatus as in claim 13, wherein said rotor has only one said elastomeric ring.

15. Data reading apparatus as in claims 9 or 12, wherein the radial extent of said elastomeric ring between its inner and outer radii is a small fraction of its inner radius.

16. Data reading apparatus, including a rotor, means for turning the rotor about an axis, a reading head, and sheet-guiding means for guiding a sheet along a path from an entry point to an ejection point adjacent the entry point, said path including an approach region, a reading region and a delivery region, and a reading head disposed in said reading region, said sheet-guiding means including edge guide means providing an edge guide in a plane transverse to the rotor's axis, said rotor having annular elastomeric drive means cooperating with said sheet-guiding means along said approach region of the path and effective to align each sheet with said edge guide and to drive the sheet through said approach range and to project each aligned sheet into the reading region of the path, said sheet-guiding means including inner and outer guides spanning the reading head and shaped to space the portion of the feed path at the reading head away from the rotor and out of cooperation with said elastomeric drive means, and said annular elastomeric drive means cooperating with said sheet-guiding means along said delivery region of the path so as to withdraw successive sheets from the reading region and to maintain alignment of each sheet against the side guide means as such sheet is being drawn out of said reading region of the path.

17. Sheet feeding apparatus, including a rotor and means for driving said rotor, and means for guiding a sheet along a path partway around the rotor, said sheet guiding means including prominently arcuate stationary outer guide means curved about said rotor, and said rotor having a peripheral elastomeric ring for pressing a sheet against said outer guide means and driving the sheet along said prominently arcuate outer guide means, wherein said sheet guiding means additionally includes prominently arcuate stationary inner guide means interposed between said outer guide means and said rotor, said inner guide means being so relieved as to enable said elastomeric ring to press a sheet against said outer guide means.

18. Sheet feeding apparatus, including a rotor and means for driving said rotor, and means for guiding a sheet along a path partway around the rotor, said sheet guiding means including prominently arcuate stationary outer guide means curved about said rotor, and said rotor having a peripheral elastomeric ring for pressing a sheet against said outer guide means and driving the sheet along said prominently arcuate outer guide means, wherein said sheet guiding means includes side guide means providing a side guide in a plane transverse to the rotor's axis and wherein said elastomeric ring is adapted by its cross-section to become so deformed locally that when an elemental length of the ring's sheet-engaging rim is depressed toward the rotor's axis, that elemental length of the ring's rim tends to be shifted toward said traverse plane, at least an extended portion of said outer guide means having a sheet-engaging surface that is progressively closer to the rotor's axis along said path in the direction of advancing travel of a sheet, for adapting the ring to bias successive sheets, including a side edge of each sheet, against and into alignment with said guide.

19. Sheet feed apparatus, including a rotor and means for driving said rotor, and means for guiding a sheet along a path partway around the rotor, said sheet guiding means including prominently arcuate stationary outer guide means curved about said rotor, and said rotor having a peripheral elastomeric ring for pressing a sheet against said outer guide means and driving the sheet along said prominently arcuate outer guide means, wherein said sheet guiding means includes side guide means providing a side guide in a plane transverse to the rotor's axis and wherein said elastomeric ring has an annular wall having an annular base portion and a rim and an annular web from the base portion to the rim, the rim being closer than said base portion to said transverse plane and being farther than said base portion from the rotor's axis, at least an extended portion of said outer guide means having a sheet-engaging surface that is progressively closer to the rotor's axis along said path in the direction of advancing travel of a sheet, for adapting the ring to bias successive sheets, including a side edge of each sheet, against and into alignment with said side guide.

20. Sheet feeding apparatus as in claim 19, wherein said web, as viewed in a radial plane containing the rotor's axis, bulges away from said transverse plane and wherein said rim is circumferentially continuous.

21. Sheet feeding apparatus as in claims 18 or 21 wherein the radial extent of said elastomeric ring between its inner and outer radii is a small fraction of its inner radius.

22. Data reading apparatus, including a rotor bearing card-impelling means, means for driving said rotor, a readily removable data reading head disposed opposite to said rotor, an arcuate approach outer guide segment for biasing a card against said card-impelling means along an arc of the rotor approaching the reading head, establishing an approach region of a card-feed path, a read-region outer guide opposite said rotor for extending said card-feed path along a read region past the reading head, said reading head having a sensing face bearing against said read-region outer guide, said read-region outer guide being apertured for enabling the reading head to sense data-bearing cards transported along said path and the thickness of said read-region outer guide establishing a minimum sensing gap between said sensing face and cards in the read region of said path, and manually releasable means for holding said sensing head in position, said read-region outer guide being readily removable after said sensing head is removed.

23. Data reading apparatus as in claim 22, wherein said card-impelling means comprises an elastomer ring, further including an approach inner guide extending arcuately between said rotor and said approach outer guide segment, said approach inner guide being relieved to enable said elastomeric ring to press a card against said approach outer guide segment, said approach inner guide segment having a pivotal support whose axis is parallel to that of the rotor, said approach outer guide segment being readily removable and said approach inner guide being pivotally movable away from the rotor.

24. Data reading apparatus as in claim 23, further including a read-region inner guide between said rotor and said read-region outer guide.

25. Data reading apparatus as in claim 23, further including an arcuate delivery outer guide segment for biasing a card against said elastomer ring along a delivery region of the path extending from said read region, a delivery inner guide extending arcuately between said rotor and said delivery outer guide segment, said delivery inner guide being relieved to enable said elastomeric ring to press a card against said delivery outer guide segment, said delivery inner guide having a pivotal support whose axis is parallel to that of the rotor and said delivery inner guide being pivotally movable away from said delivery outer guide segment after removal of said rotor.

26. Data reading apparatus as in claim 25, wherein said approach outer guide segment and said read-region outer guide and said delivery outer guide segment are related to provide a bump-free guide surface for a card driven along said path by said rotor.

27. Data reading apparatus as in claim 25, further including a read-region inner guide between said rotor and said read-region outer guide, said read-region outer guide and said read-region inner guide defining a portion of said path that arches away from said rotor and out of contact with said elastomeric ring.

28. Data reading apparatus as in claim 22, further including an arcuate delivery outer guide segment for biasing a card against said card-impelling means of the rotor along a delivery region of the path extending from said read region.

29. Data reading apparatus, including a reading head and means for transporting data-bearing cards past said reading head along approach and delivery segments of a card-feed path toward and away from the reading head, the card-transporting means including a motor-driven rotor having a peripheral elastomeric ring, approach and delivery outer guide segments for pressing cards against said elastomeric ring along said approach and delivery segments of the card-feed path, said outer guide segments being relieved to avoid contact with the elastomeric ring in the absence of a card, and approach and delivery inner guide segments between said rotor and said outer guide segments, respectively, said inner guide segments being relieved to enable the elastomeric ring to press a card against said outer guide segments.

30. Data reading apparatus as in claim 29, further including a bridging outer guide member between said approach and delivery outer guide segments and a bridging inner guide member between said approach and delivery inner guide segments, said bridging outer and inner guide members being arched toward said reading head and away from the elastomeric ring.

31. Data reading apparatus as in claim 29, wherein said inner guide segments are supported, clam-shell fashion, on a common pivot having an axis parallel to that of the rotor.

32. Sheet feeding apparatus, including a rotor and means for driving said rotor, and means for guiding a sheet along a path partway around the rotor, said sheet guiding means including prominently arcuate stationary outer guide means curved about said rotor, and said rotor having a surrounding peripheral elastomeric member for pressing a sheet against said outer guide means and driving the sheet along said prominently arcuate outer guide means, said sheet guiding means including side guide means providing a side guide in a plane transverse to the rotor's axis, said elastomeric member being adapted by its cross-section to become so deformed locally that when an elemental length of its sheet-engaging periphery is depressed toward the rotor's axis, that elemental length of said periphery tends to be shifted toward said transverse plane, at least an extended portion of said outer guide means having a sheet-engaging surface that is progressively closer to the rotor's axis along said path in the direction of advancing travel of a sheet for adapting said elastomeric member to bias a side edge of each successive sheet against and into alignment with said side guide, the sheet-guiding means being relieved, in the region along said path next following the portion of the sheet-engaging surface that is nearest to said axis, so that pressure of said elastomeric member against the front of the sheet is unresisted at the back of the sheet.

* * * * *